July 28, 1964   H. M. GEYER   3,142,201
PROTECTIVE COVER FOR ACTUATOR SCREW SHAFT
Filed Aug. 29, 1962
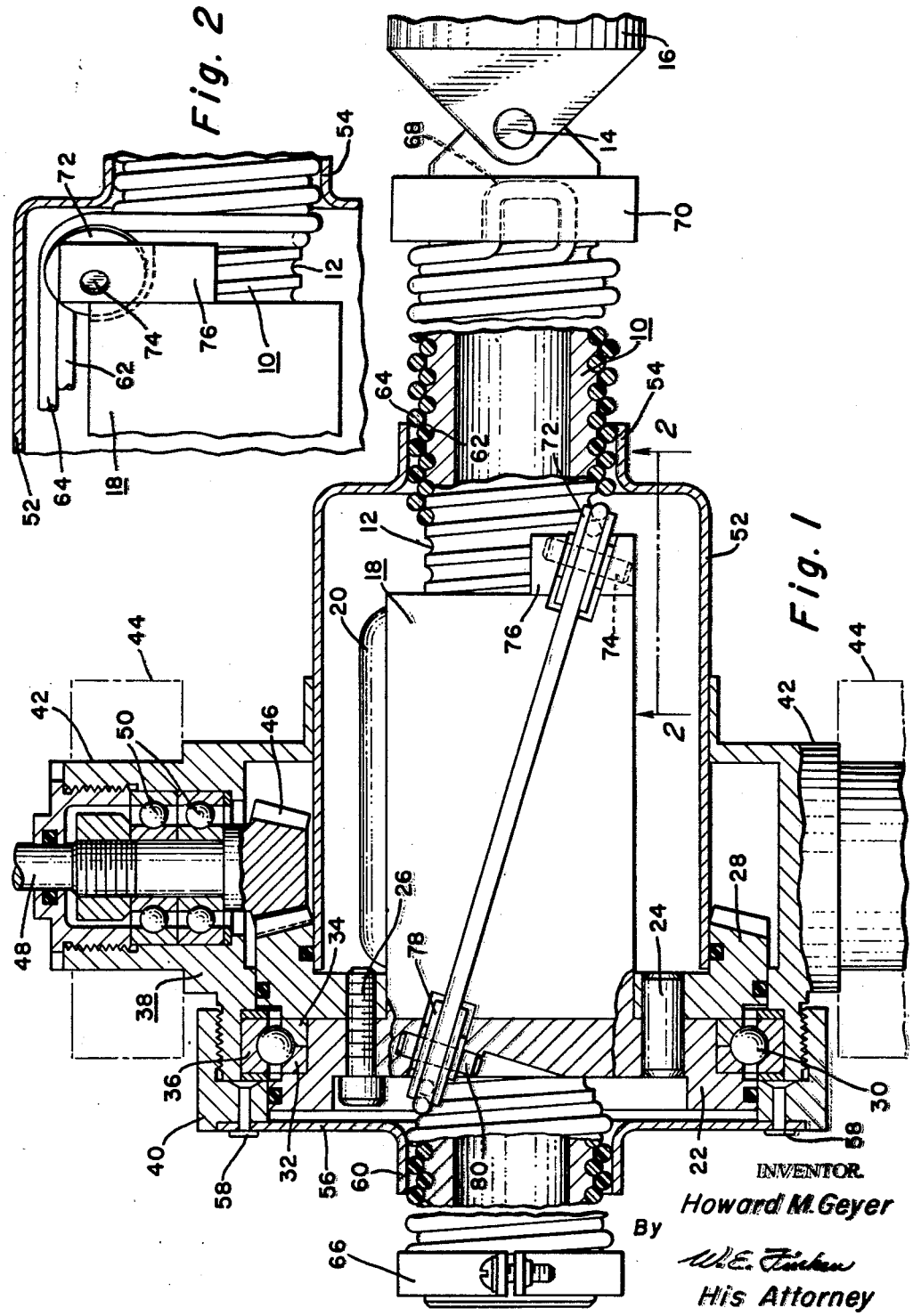
INVENTOR.
Howard M. Geyer
By
His Attorney 3,142,201
PROTECTIVE COVER FOR ACTUATOR
SCREW SHAFT
Howard M. Geyer, Dayton, Ohio, assignor to General Motors Corporation, Detroit, Mich., a corporation of Delaware
Filed Aug. 29, 1962, Ser. No. 220,172
10 Claims. (Cl. 74—608)

This invention pertains to screw and nut actuators, and particularly to protective cover means for a screw shaft of a screw and nut actuator.

Heretofore, telescopically arranged tubular shields have been used in screw and nut actuators to prevent the accumulation of dust and dirt on the screw and nut components. While the aforesaid telescopic shield arrangement is satisfactory in actuatory constructions wherein the length of the screw shaft is relatively short, such tubular shield arrangements are impractical for elongate screw shafts. The present invention relates to a flexible cord covering for an elongate screw shaft of a screw and nut actuator which protects the otherwise exposed screw shaft from dust and dirt and can be used irrespective of the length of the screw shaft.

Accordingly, among my objects are the provision of an improved screw and nut actuator including cord-type sealing means for the screw shaft; the further provision of a screw and nut actuator including a double strand protective cord cover for the screw shaft wherein one cord strand is situated in the groove of the screw shaft and another cord strand is nested therebetween so as to completely seal the screw shaft; and the still further provision of a screw and nut actuator of the aforesaid type including means for automatically unwinding and rewinding the cord covering from the screw shaft during relative rotation between the nut and the screw shaft.

The aforementioned and other objects are accomplished in the present invention by enclosing the exposed portions of the screw shaft with a double strand cord covering which is wound thereabout and guided over the nut. Specifically, one cord strand is wound in the helical groove of the screw shaft and a second cord strand overlies the first cord strand, adjacent convolutions of the two cord strands being in abutting relation so as to completely seal the exposed portions of the screw shaft. The ends of the two cord strands are attached to the ends of the screw shaft. The nut carries a pair of grooved guide rollers adjacent the ends thereof, and both strands of the cord extend thereover. Upon relative rotation between the nut and the screw shaft the two strands of the cord will be unwound from one end of the screw shaft and rewound on the other end of the screw shaft.

Further objects and advantages of the present invention will be apparent from the following description, reference being had to the accompanying drawing, wherein a preferred embodiment of the present invention is clearly shown.

In the drawing:

FIGURE 1 is a fragmentary view, partly in section and partly in elevation, of an actuator constructed according to the present invention.

FIGURE 2 is a fragmentary view, partly in section and partly in elevation, taken along line 2—2 of FIGURE 1.

With reference to the drawing, the improved actuator comprises a hollow screw shaft 10 having a helical groove 12 of substantially semicircular configuration in its outer peripheral surface. One end of the screw shaft is connected by a cross pin 14 to a movable load device 16 which restrains the screw shaft 10 against rotation. The screw shaft engages a nut 18 having a helical groove of the same size and pitch as the groove 12 on the inner annular surface thereof, and the threaded connection between the nut and the screw shaft is effected by a plurality of ball bearings, not shown, thus forming a well known ball, screw and nut connection. A circulating passage 20 is provided in the nut 18 to facilitate movement of the ball bearings from one end of the nut to the other during relative rotation between the nut and the screw shaft.

In the embodiment specifically disclosed herein, the nut 18 is designed to rotate relative to the screw shaft so as to impart axial movement to the screw shaft 10. However, the protective cord cover can be used equally as well in actuators having a rotatable screw shaft and a reciprocable nut. The rotatable nut 18 is formed with an end flange 22 that is connected by a dowel pin 24 and a plurality of circumferentially spaced bolts 26 to a flanged bevel gear 28. A thrust ball bearing assembly 30 is disposed between the bevel gear 28 and the flange 22. The thrust ball bearing assembly 30 includes a split inner race including parts 32 and 34 and a unitary outer race 36 which is clamped between a housing 38 and an end cap 40. The housing 38 includes a pair of diametrically opposed mounting trunnions 42 for attaching the actuator to a fixed support indicated by broken lines 44.

The bevel gear 28 meshes with a bevel pinion 46 attached to a drive shaft 48 and journalled by ball bearing assemblies 50. The shaft 48 can be connected to any suitable rotary reversible motor, either hydraulic or electric, not shown, for imparting rotation to the nut 18 in either direction.

The nut 18 is enclosed by a sheet metal cover 52 suitably connected to the housing 38 and having a tubular extension 54 radially spaced from the periphery of the screw shaft 10. A sheet metal cover 56 is attached to the end cap 40 by rivets 58, the cover 56 likewise having a tubular extension 60 radially spaced from the periphery of the screw shaft 10.

A double strand nylon cord, circular in cross-section, is tightly wrapped around the exposed portions of the elongate screw shaft 10. The convolutions of the first strand 62 are disposed in the helical grooves 12 of the screw shaft, and the convolutions of the second strand 64 are nested between adjacent convolutions of the first strand 62 and are in engagement therewith. The cord covering is applied by initially attaching the end of the first, or inner, strand 62 to the left hand end of the screw shaft 10 by means of a clamp 66. The inner strand 62 is then tightly wound in the helical groove 12 of the screw shaft, over guide rollers 78 and 72 and then tightly wound in the helical groove of the right hand end of the screw shaft. The inner strand 62 of the cord is then threaded into a U-shaped slot 68 in a flange 70 at the right hand end of the screw shaft. Thereafter, the outer strand 64 is tightly wound between the helical convolutions of the inner strand 62 on the right hand end of the screw shaft, and over the inner strand 62 in the guide rollers 72 and 78, and thereafter tightly wound between the convolutions of the inner strand on the left hand end of the screw shaft 10. The end of the outer strand 64 is likewise securely fastened to the left hand end of the screw shaft by the clamp 66.

It is to be understood that the cord covering is wound on the screw shaft prior to attaching the sheet metal covers 52 and 56 to the housing 38. Moreover, by winding the cord strands over the exposed portion of the screw shaft in the aforesaid manner, it is unnecessary to provide cord strands for the length of the helical paths between the two guide rollers on the nut.

The guide roller 72 is rotatably supported on a suitable shaft 74 carried by a bracket 76 attached to one end of the nut 18. The guide roller 78 is rotatably supported on a stub shaft 80 carried by the flanged end 22 of the nut 18. The guide rollers 72 and 78 are arranged obliquely to the longitudinal axis of the screw shaft so as to facilitate unwinding and rewinding of the cord strands during relative rotation between the nut and the screw shaft. In addition, both guide rollers have grooves of sufficient depth to support the strands 62 and 64 of the cord in superposed relation as shown in FIGURES 1 and 2. In addition, the grooves in the guide rollers have a width substantially equal to the diameter of the cord strands, this relationship likewise existing with respect to the semicircular groove 12 in the screw shaft and the cord strands.

In operation, as the nut 18 is rotated in the counterclockwise direction, as shown in FIGURE 1, relative to the screw shaft 10, the screw shaft 10 will move axially to the left. The strands 62 and 64 will be unwound from the right hand end of the screw shaft and rewound on the left hand end of the screw shaft 10 with the intermediate portions thereof being supported in superposed relation by the guide rollers 72 and 78. The tubular extensions 54 and 60 of the covers 52 and 56, respectively, engage the outer strands 64 of the cord covering and thus constitute a seal preventing the entrance of dust and dirt into the housing wherein the screw shaft is exposed.

While the embodiment of the invention as herein disclosed constitutes a preferred from, it is to be understood that other forms might be adopted.

What is claimed is as follows:

1. In a screw and nut type actuator, an elongate screw shaft, a nut having threaded engagement with said screw shaft, and protective cord cover means for said screw shaft comprising a flexible cord wound around said screw shaft on one side of said nut and guided over said nut and wound around said screw shaft on the other side of said nut whereby relative rotation between said nut and said screw shaft will result in unwinding said cord from said screw shaft on one side of said nut and rewinding said cord on said screw shaft on the other side of said nut.

2. In a screw and nut type actuator, an elongate helically grooved screw shaft, a nut having threaded engagement with said screw shaft, protective cord cover means for said screw shaft comprising a pair of helically wound cord strands, the inner cord strand engaging the grooves of said screw shaft and the outer cord strand being nested with the coil of the inner cord strand and in engagement with adjacent convolutions thereof, and means guiding said inner and outer cord strands over said nut in superposed relation whereby relative rotation between said nut and said screw shaft will result in unwinding said cord strands from said screw shaft on one side of said nut and rewinding said cord strands on said screw shaft on the other side of said nut.

3. In a screw and nut type actuator, an elongated screw shaft, a nut having threaded engagement with said screw shaft, a guide roller supported by said nut adjacent each end thereof, and protective cover means for said screw shaft comprising a flexible cord wound around said screw shaft and extending over said guide rollers whereby relative rotation between said screw shaft and said nut will result in unwinding said cord from said screw shaft on one side of said nut and rewinding said cord on said screw shaft on the other side of said nut.

4. In a screw and nut type actuator, an elongate screw shaft, a nut having threaded engagement with said screw shaft, a pair of guide rollers supported by said nut adjacent the ends thereof and arranged obliquely relative to the longitudinal axis of said screw shaft, protective cover means for said screw shaft comprising a flexible cord wound around said screw shaft and extending over said guide rollers whereby relative rotation between said screw shaft and said nut will result in unwinding said cord from the screw shaft on one side of said nut and rewinding the cord on said screw shaft on the other side of said nut.

5. A protective cord covering for a helically grooved screw shaft of a screw and nut type actuator including, a first cord strand of helical convolution disposed in the helical grooves of said screw shaft, guided over said nut and having its ends attached to said screw shaft and a second cord strand nested with the coil of the first cord strand and in engagement with adjacent convolutions thereof, guided over said nut and having its ends attached to said screw shaft whereby said first and second cord strands will be unwound and rewound from and on said screw shaft on opposite sides of said nut during relative rotation between said nut and said screw shaft.

6. In an actuator of the type including an axially movable screw shaft and a rotatable nut threadedly connected therewith and restrained against axial movement whereby rotation of said nut will impart axial movement to said screw shaft, protective cord cover means for the exposed portions of said screw shaft comprising a flexible cord having its ends attached to said screw shaft and convolutions thereof wound around said screw shaft and extending over said nut, and guide roller means carried by said nut and supporting said flexible cord whereby said cord will be unwound and rewound from and on said screw shaft on opposite sides of said nut during rotation of said nut relative to said screw shaft.

7. In an actuator of the type including an axially movable helically grooved screw shaft and a rotatable nut theadedly connected therewith and restrained against axial movement whereby rotation of said nut will impart axial movement to said screw shaft, protective cord cover means for the exposed portions of said screw shaft comprising an inner cord strand with helical convolutions disposed in the helical grooves of said screw shaft and an outer cord strand of helical convolutions nested between convolutions of said inner strand and in engagement therewith, and guide roller means carried by said nut and supporting said inner and outer cord strands in superposed relation across said nut whereby said cord strands will be unwound and rewound from an on said screw shaft on opposite sides of said nut during rotation of said nut relative to said screw shaft.

8. The combination set forth in claim 7 wherein the helical grooves in said screw shaft are semicircular in cross section and wherein said cord strands are circular in cross section and have a diameter substantially equal to the diameter of the semicircular grooves in said screw shaft.

9. The combination set forth in claim 8 wherein said guide roller means comprises a pair of guide rollers supported on said screw shaft adjacent the ends thereof and oriented obliquely relative to the axis of said screw shaft, said guide rollers having grooves with a width subtantially equal to the diameter of said cord strands and of sufficient depth to support both cord strands in superposed relation.

10. The combination set forth in claim 7 including a housing for said nut, and a pair of covers attached to opposite ends of said housing having tubular extensions engageable with the outer strands of said protective cord cover means.

References Cited in the file of this patent
UNITED STATES PATENTS
2,907,361 Roberts _____ Oct. 6, 1959